(12) United States Patent
Ohtomo et al.

(10) Patent No.: US 6,450,267 B2
(45) Date of Patent: Sep. 17, 2002

(54) CONSTRUCTION EQUIPMENT CONTROL SYSTEM

(75) Inventors: Fumio Ohtomo; Kazuaki Kimura, both of Tokyo-to (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 9 days.

(21) Appl. No.: 09/801,152

(22) Filed: Mar. 7, 2001

(51) Int. Cl.⁷ .................................................. E02F 3/76
(52) U.S. Cl. .................... 172/4.5; 356/4.08; 356/141.1; 701/50
(58) Field of Search .............................. 172/2, 4, 4.5, 5, 172/828, 810; 37/348, 382; 33/1 CC; 701/50; 356/4.08, 141.1, 139.01, 139.07, 147

(56) References Cited

U.S. PATENT DOCUMENTS

| | | | |
|---|---|---|---|
| 4,677,555 A | * | 6/1987 | Goyet |
| 4,807,131 A | | 2/1989 | Clegg .................... 364/424.01 |
| 4,820,041 A | * | 4/1989 | Davidson et al. |
| 5,174,385 A | * | 12/1992 | Shinbo et al. |
| 5,951,613 A | * | 9/1999 | Sahm et al. |
| 6,068,060 A | * | 5/2000 | Ohtomo et al. |
| 6,108,076 A | * | 8/2000 | Hanseder |
| 6,112,145 A | * | 8/2000 | Zachman |
| 6,151,106 A | * | 11/2000 | Ohtomo et al. |
| 6,324,455 B1 | * | 11/2001 | Jackson |

FOREIGN PATENT DOCUMENTS

JP            11-256620        * 9/1999

* cited by examiner

Primary Examiner—Victor Batson
(74) Attorney, Agent, or Firm—Nields & Lemack

(57) ABSTRACT

The present invention relates to a construction equipment control system, which comprises a plurality of rotary laser irradiating systems for forming laser reference planes by irradiating laser beams by rotary irradiation, a surveying system for measuring positions of the rotary laser irradiating systems, and a construction operation system for controlling and operating construction work of a construction equipment based on the laser reference planes, wherein the construction operation system comprises a photodetection sensor for receiving light beams from the rotary laser irradiating systems as reference positions for the construction operation, a global positioning system (GPS) for detecting a position of the construction equipment, and transmitting structure for transmitting detection results of said GPS to the surveying system, the surveying system comprises transmitting structure for transmitting data relating to the reference planes to be formed based on the results of measurement and results of detection of the GPS to the rotary laser irradiating systems, the rotary laser irradiating systems comprise receiving structure, the receiving structure receives data from the transmitting structrue, the rotary laser irradiating systems form the laser reference planes based on the data, and the construction equipment performs construction work using the laser reference planes as reference.

10 Claims, 8 Drawing Sheets

CONSTRUCTION EQUIPMENT CONTROL SYSTEM

BACKGROUND OF THE INVENTION

The present invention relates to a rotary laser irradiating system for forming a reference plane in civil engineering work such as ground leveling work. In particular, the invention relates to a construction equipment control system utilizing a laser reference plane to be formed by rotary irradiation of a laser beam for the purpose of controlling height in ground leveling operation.

When ground leveling operation for preparing land for housing lots or for road paving is performed using construction equipment such as a bulldozer, a grader, etc., a reference for the ground leveling is needed. In recent years, a system using a laser beam has become widespread for the purpose of determining height, which serves as a reference for the ground leveling operation. As one of the systems using the laser beam, there is a construction equipment control system which comprises rotary laser irradiating systems.

FIG. 8 shows a case where this construction equipment control system is adopted for a bulldozer.

In FIG. 8, reference numeral 1 denotes a rotary laser irradiating system, and 2 a bulldozer. The rotary laser irradiating system 1 is placed at a predetermined position via a tripod 3 on the land developed for housing lots. The rotary laser irradiating system 1 projects a laser beam 4 in a horizontal direction and rotates the laser beam, and a reference plane is formed by the laser beam 4.

The bulldozer 2 has a blade 5, which is supported in such manner that it can be moved up or down. A pole 6 is erected on the blade 5, and a level sensor 7 serving as photodetecting means is mounted on the pole 6. The level sensor 7 receives the laser beam 4 from the rotary laser irradiating system 1 and detects a photodetecting position. The bulldozer 2 is provided with a control unit (not shown), which detects a height position of the blade 5 based on a photodetection signal from the level sensor 7 and controls a height of the bulldozer based on the detection results.

As described above, a horizontal reference plane is formed by the laser beam 4. By keeping a distance between the horizontal reference plane and a blade tip 5' of the blade 5 to a constant value, a ground surface can be prepared on horizontal level. Also, by changing a distance to the blade tip 5', it is possible to change the height of the leveled ground.

The laser beam 4 projected from the rotary laser irradiating system has a limited reaching range due to the limitation of light intensity. For this reason, in case of a construction site of relatively small extent, when the rotary laser irradiating system 1 is once set for the operation, the area of the scheduled construction falls within the range of the laser beam 4. However, in a construction site of wider extent, it is inconvenient that the rotary laser irradiating system must be set again and adjusted for the next operation. Further, in case of a construction with difference in elevation, the system must be set again, and the construction operation cannot be carried out continuously and must be interrupted each time for re-adjustment.

In case of road construction, road may be curved, or the laser beam 4 may be cut off by an obstacle such as a mountain or a hill, etc. In these cases, the rotary laser irradiating system 1 must be moved as the construction operation proceeds, and it must be newly set again. In addition to the troublesome procedure related to the re-setting of the system, an error may also occur during the re-setting.

SUMMARY OF THE INVENTION

To solve the above problems, it is an object of the present invention to provide a construction equipment control system, by which it is possible to perform setting of the reference planes for wider range using a plurality of rotary laser irradiating systems, to eliminate troublesome procedure caused by interrupting construction work in the middle of the work and performing re-setting, and to prevent occurrence of the error.

To attain the above object, the construction equipment control system of the present invention comprises a plurality of rotary laser irradiating systems for forming laser reference planes by irradiating laser beams by rotary irradiation, a surveying system for measuring positions of the rotary laser irradiating systems, and a construction operation system for controlling and operating construction work of a construction equipment based on the laser reference planes, wherein the construction operation system comprises a photodetection sensor for receiving light beams from the rotary laser irradiating systems as reference positions for the construction operation, a global positioning system (GPS) for detecting a position of the construction equipment, and transmitting means for transmitting detection results of the GPS to the surveying system, the surveying system comprises transmitting means for transmitting data relating to the reference planes to be formed based on results of measurement and results of detection of the GPS to the rotary laser irradiating systems, the rotary laser irradiating systems comprise receiving means, the receiving means receives the data from the transmitting means, the rotary laser irradiating systems form the laser reference planes based on the data, and the construction equipment performs construction work using the laser reference planes as reference. Also, the present invention provides a construction equipment control system as described above, wherein the surveying system comprises a operation control system for controlling construction operation of the construction equipment, the operation control system is provided with working data for performing the construction operation, calculates data for forming the laser reference planes necessary for the construction operation based on the working data and the position of the construction equipment determined by the GPS and positions of the rotary laser irradiating systems measured by the surveying systems and transmits the data to the rotary laser irradiating systems, and the laser reference planes necessary for the construction operation are formed by the rotary laser irradiating systems. Further, the present invention provides a construction equipment control system as described above, wherein the working data is height data at a construction site. Also, the present invention provides a construction equipment control system as described above, wherein the operation control system is provided with working route data indicating a route of construction. Further, the present invention provides a construction equipment control system as described above, wherein the operation control system is provided with tilting data at a construction site in addition to the construction route data indicating the route of construction. Also, the present invention provides a construction equipment control system as described above, wherein the rotary laser irradiating systems comprise a reflection unit for reflecting a distance measuring light beam toward an automatic surveying system, a rotating mechanism for directing the system itself toward a predetermined direction, a signal receiving unit for receiving communication data, a tilting mechanism for tilting the laser reference plane, and a tilt setting unit for controlling the tilting mechanism and the rotating mechanism so that the laser reference plane has a tilt angle in a predetermined direction based on the result received from the signal receiving unit. Further, the present invention provides a construction equipment control system as described above, wherein each of the rotary laser irradiating systems further comprises a lift mechanism, and elevation of the laser reference plane can be adjusted by the lift mechanism and it is controlled by the tilt setting unit together with the tilting mechanism and the rotating mechanism. Also, the present invention provides a construction equipment control system as described above, wherein the rotary laser irradiating systems synchronize rotation of laser beams. Further, wherein the laser beams irradiated from the rotary laser irradiating systems are independently modulated. Also, the present invention provides a construction equipment control system as described above, wherein there is provided an arithmetic unit for identifying the rotary laser irradiating systems based on a laser beam photodetection signal from the photodetection sensor.

Because the reference planes can be set using a plurality of rotary laser irradiating systems, laser reference planes can be formed for wider area, and continuous construction operation can be carried out at the construction site where there are differences in height or there is an obstacle to cut off the laser beam.

DETAILED DESCRIPTION OF THE PREFERRED EMBODIMENT

Figure 1:
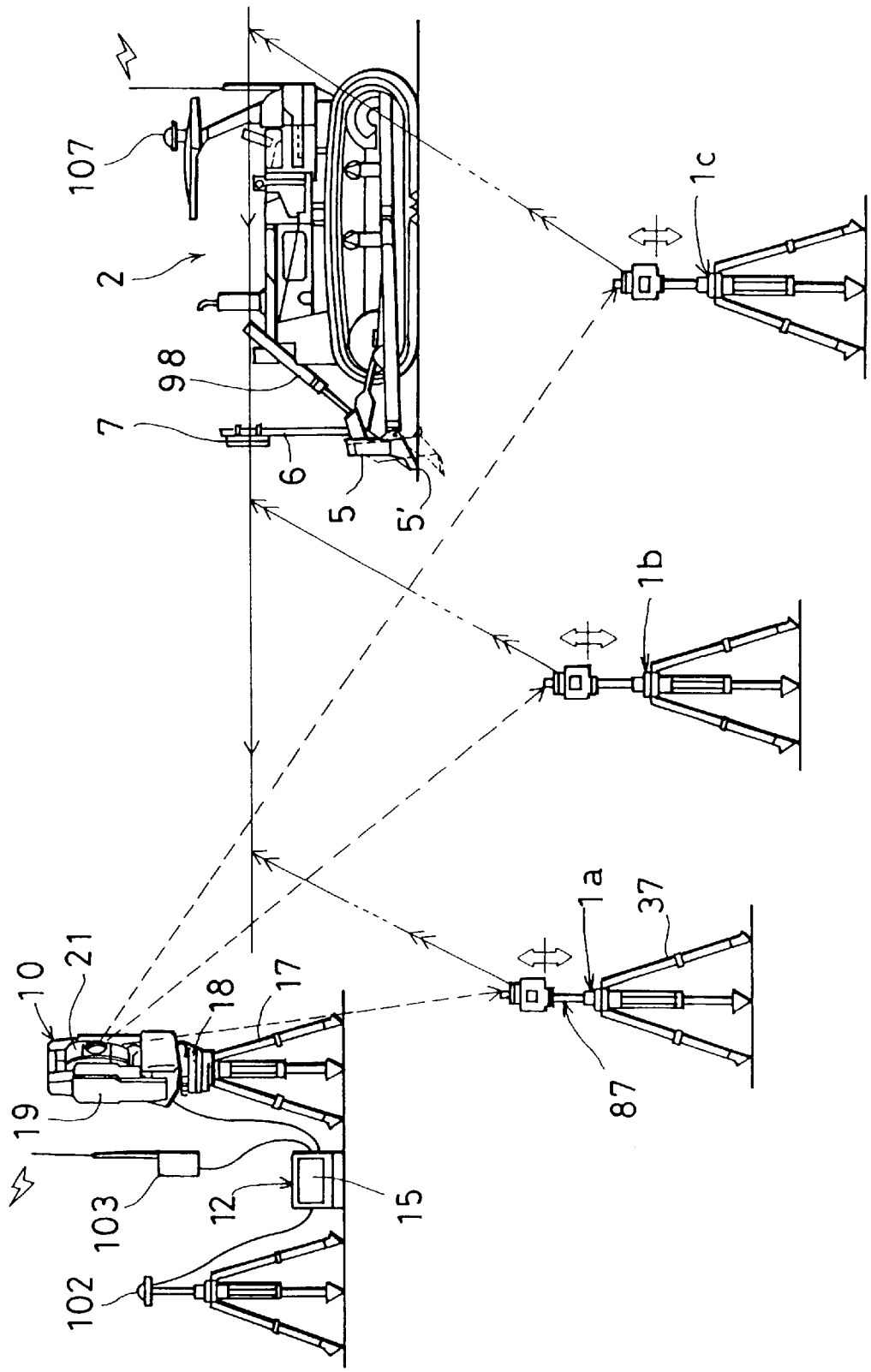
FIG. 1 is a drawing to explain an embodiment of the present invention.

Detailed description will be given below on embodiments of the present invention referring to the drawings.

Figure 2:
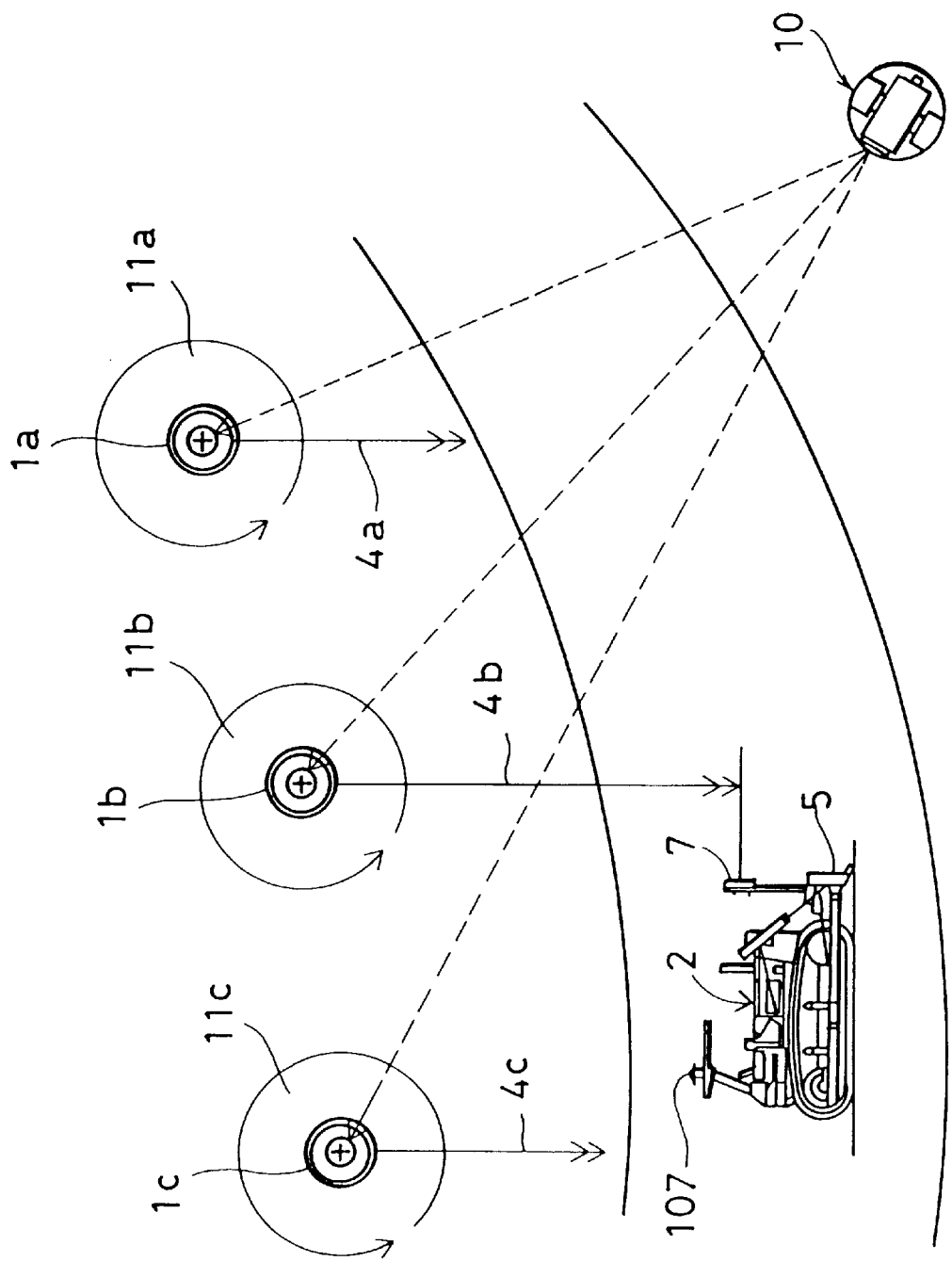
FIG. 2 is a plan view showing an arrangement of the embodiment of the present invention.
Figure 3:
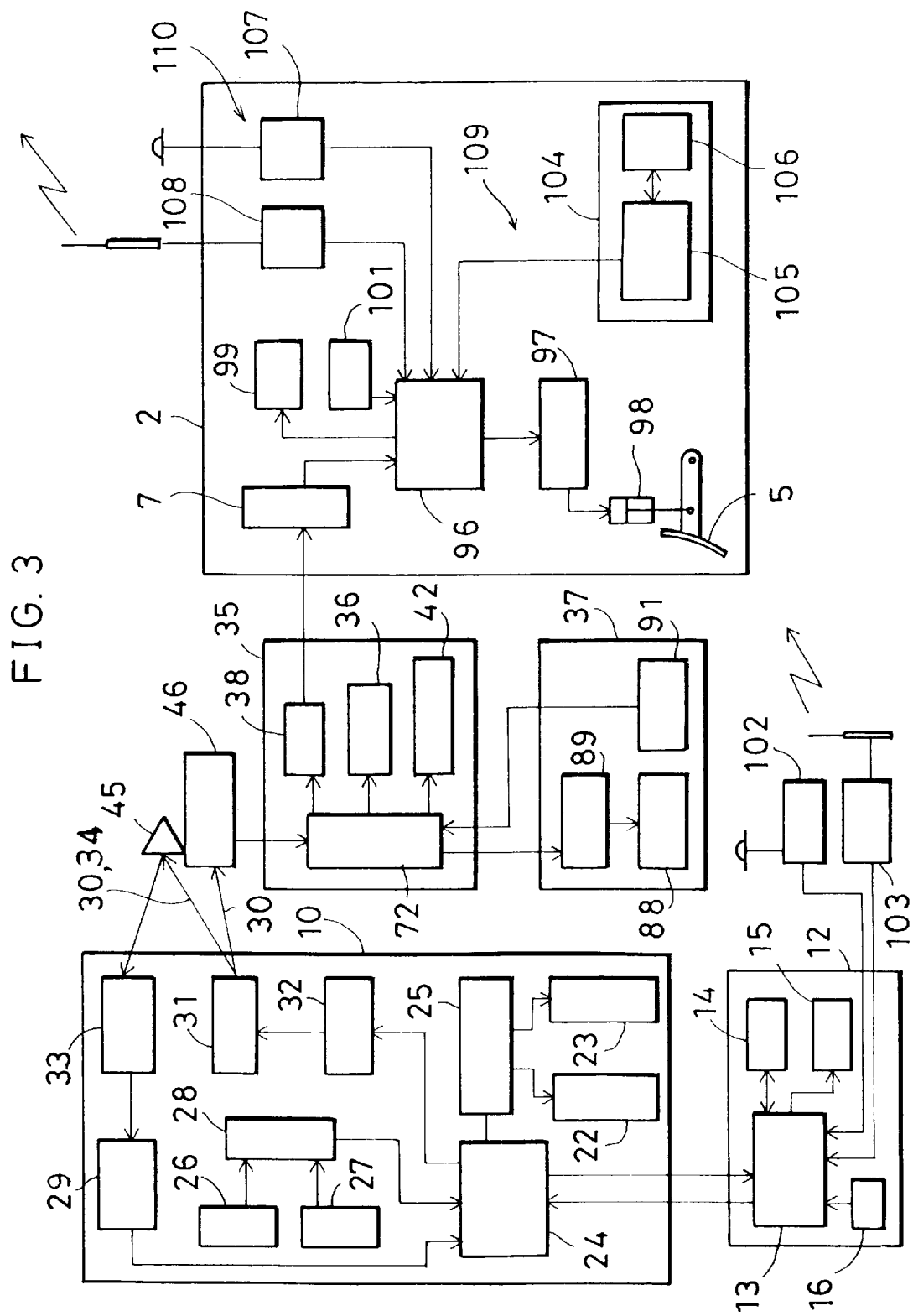
FIG. 3 is a block diagram of the embodiment of the present invention.
Figure 8:
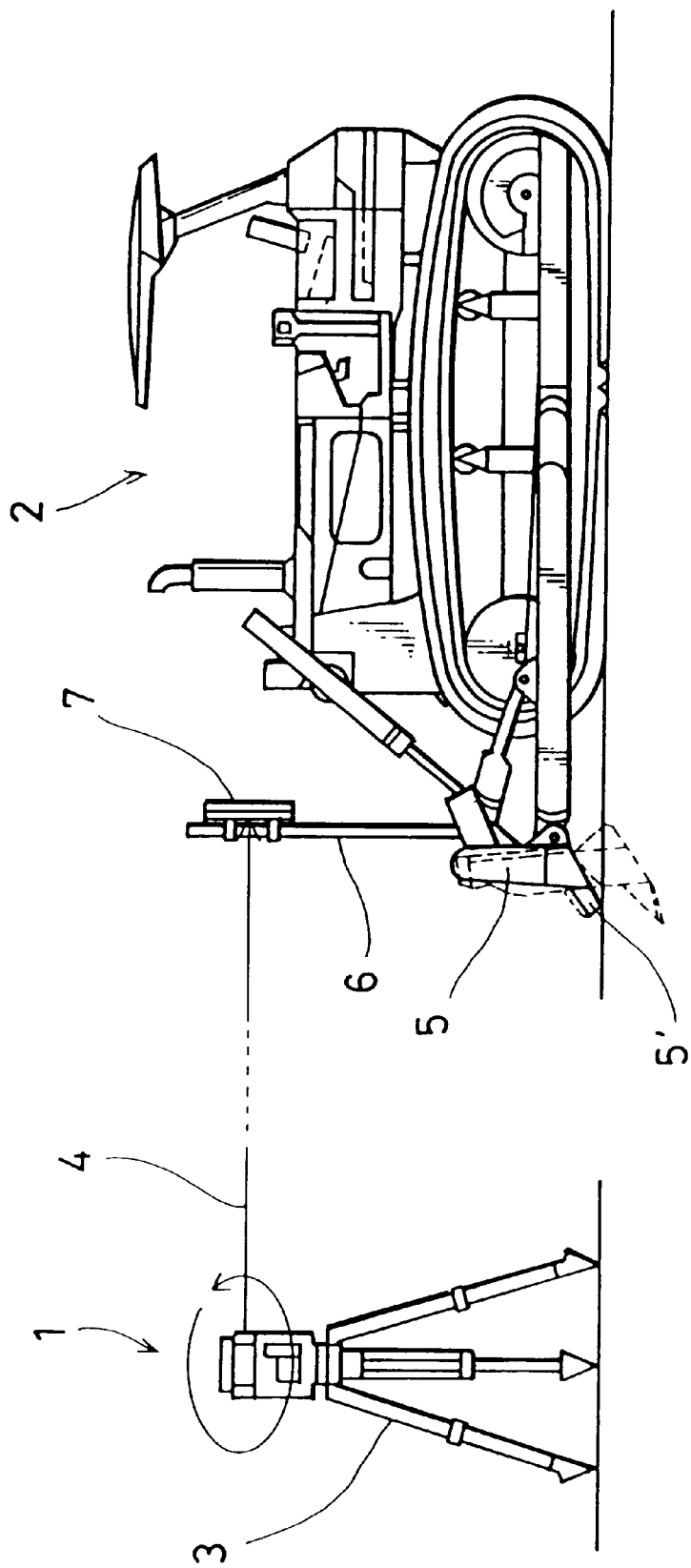
FIG. 8 is a drawing to explain a conventional example.

In FIG. 1 to FIG. 3, the same component as in FIG. 8 is referred by the same symbol, and detailed description is not given here.

The embodiment of the present invention comprises a plurality of rotary laser irradiation systems 1a, 1b and 1c (3 systems shown in the figure), each of which can form a tilted reference plane, and an automatic surveying system 10, and a global positioning system (GPS). By each of the rotary laser irradiating systems 1a, 1b and 1c, reference planes 11a, 11b and 11c to cover an extensive area are formed respectively. Civil engineering work is carried out by a bulldozer 2 using the reference planes 11a, 11b and 11c as references while the position of the construction equipment is surveyed using the GPS.

Within a area of the scheduled construction project, a plurality of rotary laser irradiation systems 1 are arranged. The rotary laser irradiation systems 1a, 1b and 1c are separated from each other by such a distance that the formed reference planes 11a, 11b and 11c are overlapped on each other to a certain extent. The automatic surveying system 10 is provided at a distance from the construction area and at a known point. In case it is not a known point or in case of kinematic surveying, a second GPS receiver 102 is provided. To the automatic surveying system 10, an operation control system 12 typically represented by a personal computer (PC) is connected. The second GPS receiver 102 and a radio transceiver 103 are connected to the operation control system 12. The result of position measurement by the second GPS receiver 102 and the information received by the radio transceiver 103 are inputted to the operation control system 12.

Based on the results of receiving by the second GPS receiver 102 and a first GPS receiver 107 (to be described later) which is installed on the bulldozer 2, kinematic surveying is performed, and position measurement for the automatic surveying system 10 and position measurement for the bulldozer 2 are carried out. The second GPS receiver 102, the first GPS receiver 107, and the operation control system 12 make up together a surveying system. A radio transceiver unit 110 (to be described later) installed on the bulldozer 2, the first GPS receiver 107, and the radio transceiver 103 make up together a data communication system. The second GPS receiver 102 and the first GPS receiver 107 make up together a kinematic surveying system. If accuracy high enough can be obtained, only the first GPS receiver 107 may be used.

The results of the calculation at the operation control system 12 can be transmitted to the radio transceiver 110 via the radio transceiver 103.

The operation control system 12 comprises an arithmetic unit 13, a storage unit 14, a display unit 15, and an input unit 16. In the storage unit 14, there are provided various types of programs necessary for arithmetic process of data such as tilt angle of each of the reference planes 11a, 11b and 11c. Also, data such as topographical data based on the working drawings are set and inputted. These data include data for the height of the ground with respect to plane coordinates. And further, data on the position of the bulldozer 2 based on GPS surveying, and programs for calculating relative positions of the rotary laser irradiating system 1 and the bulldozer 2 are set and inputted in the storage unit 14. Further, machine height of each of the rotary laser irradiating systems 1, a distance from the blade tip 5' to the reference position of the level sensor 7, etc. are set and inputted.

The automatic surveying system 10 measures the data such as survey data of position and height. The first GPS receiver 107 obtains position of the bulldozer 2. Based on the survey data, the position of the bulldozer and, further, height data in the working drawings, the operation control system 12 calculates a laser reference plane for controlling the blade tip 5' of the bulldozer 2. The operation control system 12 controls a tilting direction of each of the rotary laser systems 1a, 1b and 1c via the automatic surveying system 10 so that a predetermined laser reference plane is formed.

Now, description will be given on the automatic surveying system 10.

On a tripod 17, a frame stand 19 is placed via a base unit 18 so that it can be rotated around a vertical axis. On the frame stand 19, a telescope unit 21 is mounted so that it can be rotated around a horizontal axis. On the base unit 18, a horizontal motor 22 is provided, and an elevation motor 23 is mounted on the frame stand 19.

On the frame stand 19, a control unit 24, a rotary driving unit 25, and a distance measuring unit 29 are mounted. The rotary driving unit 25 is controlled by the control unit 24, and the horizontal motor 22 and the elevation motor 23 are driven by the rotary driving unit 25. A horizontal angle encoder 26 is provided on a rotary support of the base unit 18, and an elevation angle encoder 27 is provided on a rotary support of the telescope unit 21. Rotation angle detection signals from the horizontal angle encoder 26 and the elevation angle encoder 27 are inputted to an angle measuring unit 28. A horizontal rotation angle and a horizontal angle with respect to the reference direction of the frame stand 19 are detected, and an elevation rotation angle and an elevation angle of the telescope unit 21 are detected. A rotation angle detection signal from the angle measuring unit 28 is fed back to the control unit 24. The control unit 24 controls an amount of rotation of each of the horizontal motor 22 and the elevation motor 23 via the rotary driving unit 25 based on the rotation angle detection signal.

The telescope unit 21 comprises a light emitting unit 31, a modulation circuit 32 and a photodetection unit 33. The light emitting unit 31 emits a tracing light beam 34 or a distance measuring light beam 30 toward an object, i.e. toward each of the rotary laser irradiation systems 1. The modulation circuit 32 modulates either the tracing light 34 or the distance measuring light 30 based on communication data. By this modulation, communication data is superimposed either on the distance measuring light 30 or on the tracing light 34, and optical communication can be provided to the photodetection side.

The photodetection unit 33 receives the distance measuring light reflected from the rotary laser irradiating system 1, and a photodetection signal is outputted to the distance measuring unit 29. The distance measuring unit 29 surveys a distance to the object, and the result of the survey is inputted to the control unit 24.

Figure 4:
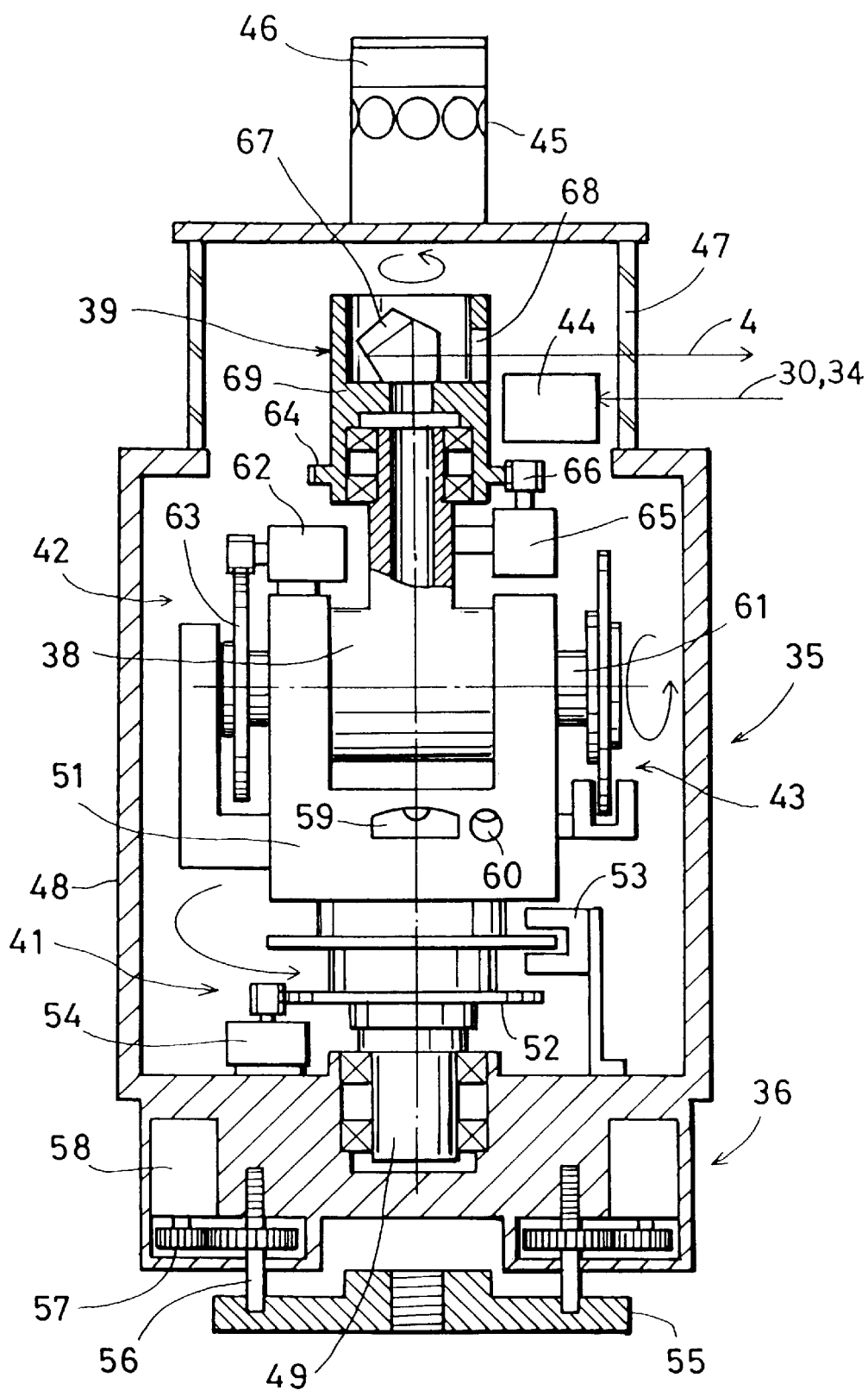
FIG. 4 is a schematical cross-sectional view of a rotary irradiation system main unit to be used in the embodiment of the invention.
Figure 5:
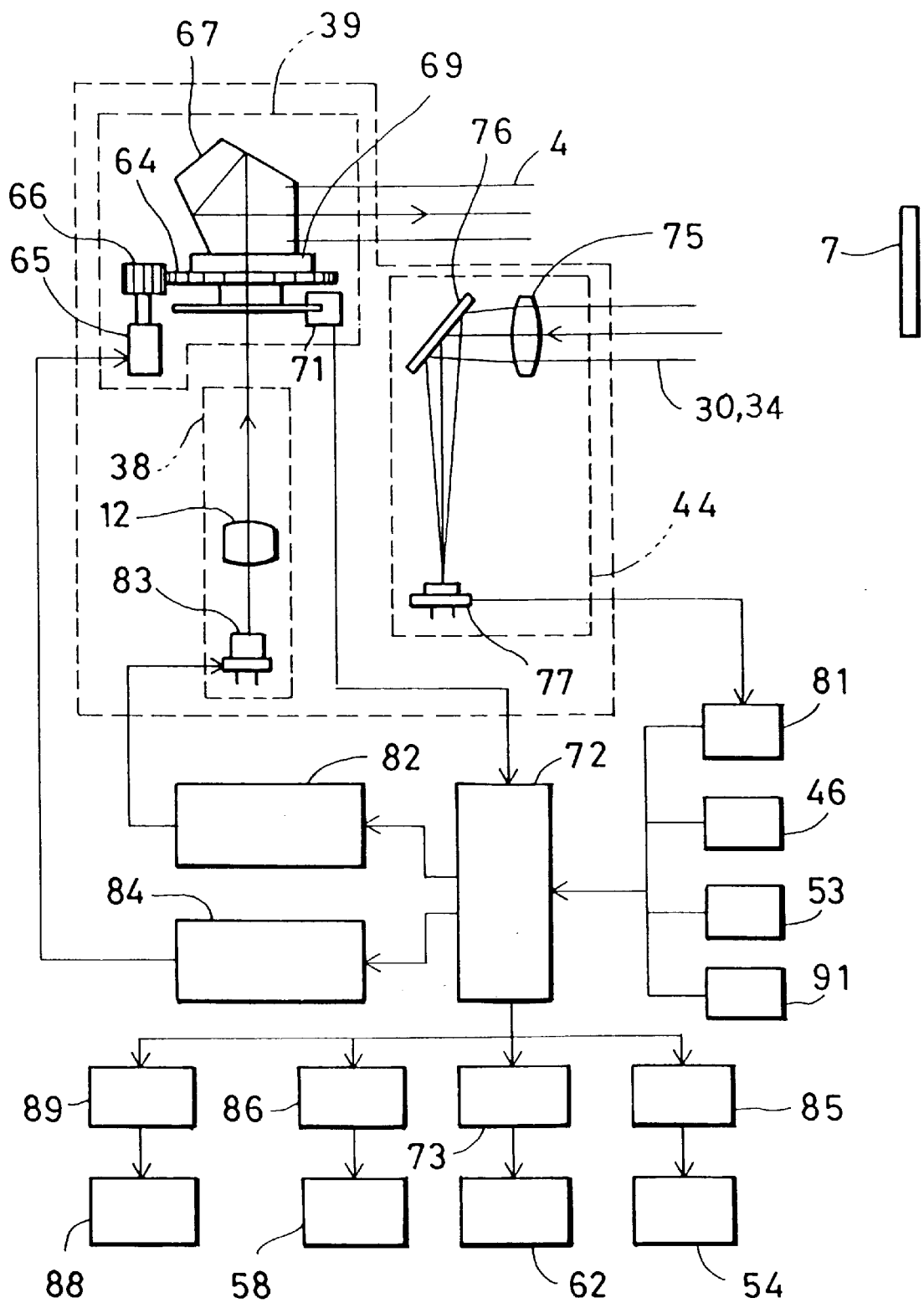
FIG. 5 is a block diagram a rotary irradiation system main unit to be used in the embodiment of the invention.

Now, description will be given on the rotary laser irradiating system 1 referring to FIG. 4 and FIG. 5.

Each of the rotary laser irradiating systems 1 comprises a tilting mechanism for tilting the irradiating direction of a laser beam 4 and a control unit for controlling the tilting mechanism. It can tilt the irradiating direction of the laser beam 4, and a horizontal reference plane or a tilted reference plane is formed by the laser beam 4.

The rotary laser irradiating system 1 comprises a rotary laser irradiating system main unit 35, and the level sensor 7 (mounted on the bulldozer 2) for detecting the laser beam 4 from the rotary laser irradiating system main unit 35. The rotary irradiating system main unit 35 is mounted on a tripod 37 via a leveling unit 36, which is arranged at lower position.

Further, the rotary irradiating system main unit 35 primarily comprises a light emitting unit 38 for emitting the laser beam 4, a rotator 39 for irradiating the laser beam 4 in the reference plane by rotary irradiation, a rotating unit 41 for rotating the light emitting unit 38 around the vertical axis, a tilt setting unit 42 for tilting the light emitting unit 38 around the horizontal axis and for setting a tilt of the reference plane formed by the laser beam 4, a tilt detector 43 for detecting tilt angle, a reflection light receiving unit 44 for receiving an incident light and for detecting a direction of the incident light, and the leveling unit 36 for performing the leveling of the rotary irradiating system main unit 35.

On the upper surface of the rotary irradiating system main unit 35 and on an extension from the rotation center of the rotator 39, there are provided a retroreflection prism 45 and a signal receiver 46. As shown in FIG. 3, the retroreflection prism 45 reflects the tracing light beam 34 and the distance measuring light beam 30 from the light emitting unit 31 toward the photodetection unit. The signal receiving unit 46 receives the distance measuring light beam 30. It detects modulation of the distance measuring light 30 and detects the communication data superimposed on the distance measuring light 30.

The rotary irradiating system main unit 35 has a light receiving window 47 on it, and the laser beam 4 from the rotator 39 is projected through the light receiving window. The tracing light 34 or the distance measuring light 30 from the automatic surveying system 10 passes through the light receiving window 47, and it is received by the reflection light receiving unit 44 installed inside the rotary irradiating system main unit 35. When the light is received by the signal receiving unit 46, the photodetection unit 44 detects a direction of the automatic surveying system 10. Based on the communication data from the automatic surveying system 10, the direction of the rotary irradiating system main unit 35 is aligned with the reference direction.

At the bottom of a casing 48 of the rotary irradiating system main unit 35, a main unit frame 51 is provided so that it can be rotated around the vertical axis via a vertical axis unit 49. A rotating unit gear 52 is mounted concentrically with the vertical axis unit 49, also there is provided a rotating unit encoder 53. A rotating unit motor 54 is provided at a position closer to the casing 48, and an output shaft of the rotating unit motor 54 is engaged with the rotating unit gear 52. When the rotating unit motor 54 is driven, the main unit frame 51 is rotated via the rotating unit gear 52. A rotation angle is detected by the rotating unit encoder 53, and the result of detection is inputted to a control unit (CPU) 72.

At the bottom of the casing 48, the leveling unit 36 is disposed. The leveling unit 36 comprises a fixed based plate 55 fixed on the tripod 37 and leveling screws 56 being placed between the fixed base plate 55 and the bottom of the casing 48. Three leveling screws 56 are provided, each at a vertex of a triangle. The upper end of each of the leveling screws is screwed into the casing 48, and its lower end is rotatably engaged in the fixed base plate 55. Each of the leveling screws 56 is connected to a leveling motor 58 via a gear train 57. When the leveling gear 56 is rotated by the leveling motor 58 via the gear train 57, a gap between the casing 48 and the fixed base plate 55 is changed, and the rotary irradiating system main unit 35 can be tilted in a direction as desired.

Tilting of the rotary irradiating system main unit 35 is detected by tilt sensors 59 and 60 provided on the main unit frame 51. The leveling operation is performed through feedback of the detection results of the tilt sensors 59 and 60 to the driving of the leveling motor 58. One of the three leveling screws 56 may not be used, and this may be used only as a tiltable supporting point.

The light emitting unit 38 is rotatably mounted on the main unit frame 51 via a horizontal tilting shaft 61. A tilting motor 62 is disposed on the main unit frame 51, and the tilting motor 62 and the tilting shaft 61 are connected with each other via a gear train 63. On the tilting shaft 61, the tilt detector 43 for detecting a tilt angle of the light emitting unit 38 is mounted. The tilt detector 43 comprises an encoder, for instance. When the tilting motor 62 is driven, the light emitting unit 38 can be tilted via the gear train 63, and the tilt angle is detected by the tilt detector 43.

On the upper end of the light emitting unit 38, the rotator 39 is rotatably mounted. The rotator 39 has a scanning gear 64, which is engaged with a driving gear 66 of a scanning motor 65. The scanning motor 65 is fixed on the light emitting unit 38. When the driving gear 66 is driven by the scanning motor 65, the rotator 39 is rotated via the scanning gear 64.

The rotator 39 deflects an optical axis of the laser beam 4 emitted from the light emitting unit 38 via a pentagonal prism 67 at an angle of 90°. The laser beam 4 is passed through a projecting window 68 and is rotated so as to form a laser plane. The pentagonal prism 67 is mounted on a rotary support 69, which is rotated around the optical axis of the light emitting unit 38, and the rotary support 69 is connected to the scanning motor 65 via the scanning gear 64 and the driving gear 66. The rotating condition of the rotary support 69 is detected by an encoder 71 mounted on the rotary support 69, and a detection signal of the encoder 71 is inputted to the control unit 72.

The tilt angle of the light emitting unit 38 is detected by the tilt detector 43 mounted on the tilting shaft 61 of the light emitting unit 38. The tilt detector 43 comprises an encoder, and an output signal from the encoder is inputted to the control unit 72. Based on the signal from the tilt detector 43, the control unit 72 calculates tilting of the light emitting unit 38 up to a predetermined tilt angle. The tilting motor 62 is driven by a tilting motor driving unit 73. The setting of the tilting can be achieved by driving the tilting motor 62 until the output of the tilt detector 43 provides a predetermined tilt angle.

The reflection light receiving unit 44 may be fixed on the casing 48, but it is preferably mounted on the light emitting unit 38 so that it can be tilted integrally with the light emitting unit 38.

Next, description will be given on the reflection light receiving unit 44.

At a position facing to the light receiving window 47, a condenser lens 75 is provided. An incident light to the condenser lens 75 is converged to a photodetection element 77 via a reflection mirror 76. A photodetection signal from the photodetection element 77 is inputted to a reflection light detector 81. The incident light from the automatic surveying system 10 as detected by the reflection light detector 81 is inputted to the control unit 72. Also, a signal from the rotating unit encoder 53 is inputted to the control unit 72. The control unit 72 drives a laser diode 83 via a light emitting element driving unit 82, drives the scanning motor 65 via a scanning motor driving unit 84, drives the rotating unit motor 54 via a rotating unit motor driving unit 85, drives the tilting motor 62 via the tilting motor driving unit 73, and drives the leveling motor 58 via a leveling motor driving unit 86 based on the signals from the tilt sensors 59 and 60.

Based on the signal from the reflection light detector 81 and a signal from the rotating unit encoder 53, the control unit 72 detects a direction of the automatic surveying system 10 and calculates in which direction and to how much angle the rotary irradiating system main unit 35 is rotated.

Next, the tripod 37 will be described.

The rotary irradiating system main unit 35 is fixed on a lift mechanism 87 via the fixed base plate 55, and the lift mechanism 87 moves the rotary irradiating system main unit 35 up or down. The tilt mechanism 87 comprises an elevation motor 88, a driving unit 89 for rotating and driving the elevation motor 88, and an elevation detection encoder 91 for detecting elevation of the rotary irradiating system main unit 35, and it can adjust the position of the rotary irradiating system main unit 35 in a height direction and can also detect the elevation position.

Figure 6:
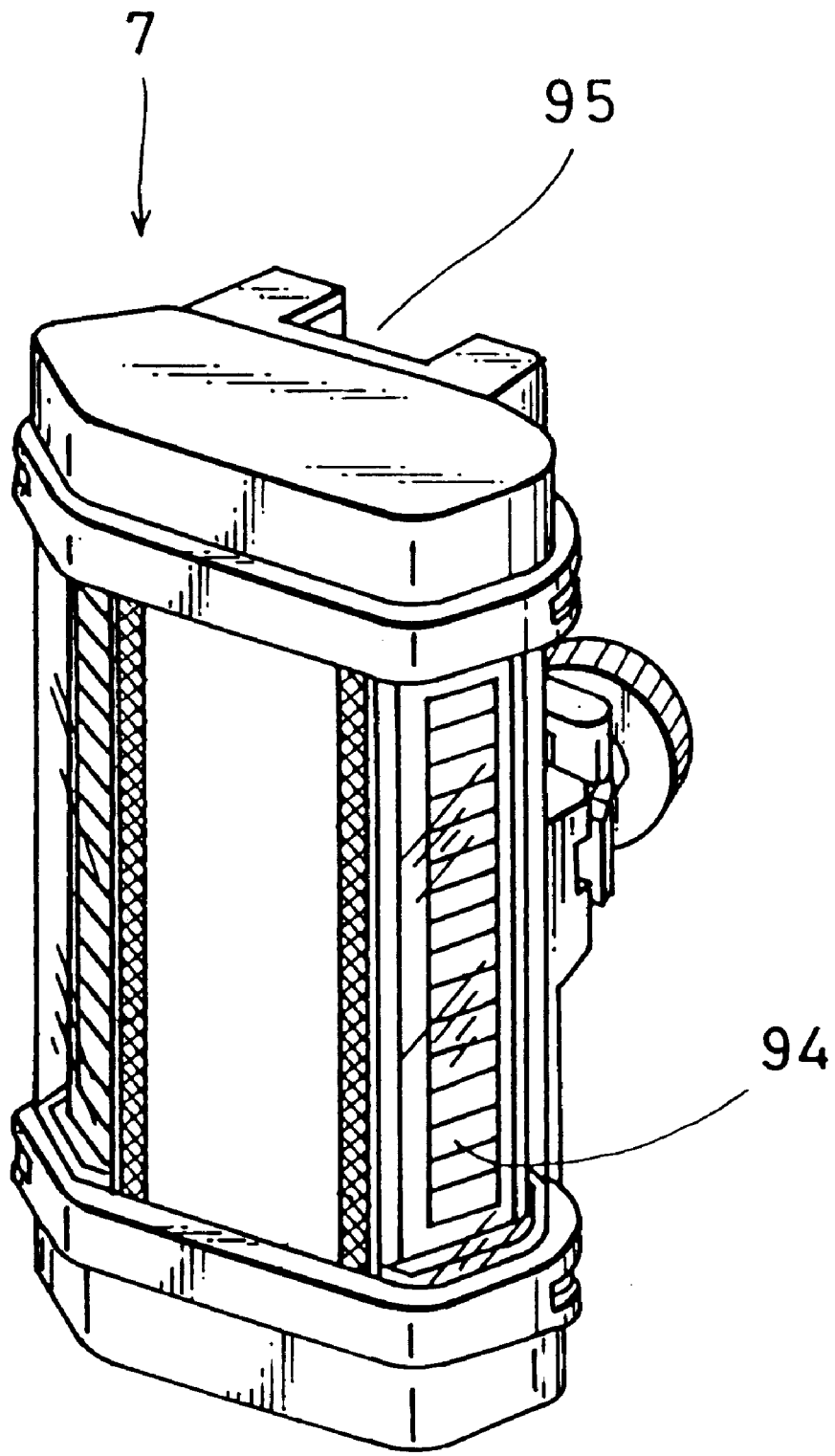
FIG. 6 is a perspective view of a level sensor used in the embodiment of the present invention.

Now, the level sensor 7 will be described referring to FIG. 6.

A photodetection unit 94 for receiving the laser beam is designed in belt-like shape extending vertically on both side surfaces of the level sensor 7, and the photodetection unit 94 is provided at a certain angle with respect to the front. The photodetection unit 94 has photodetection elements serially arranged in top-to-bottom direction. Based on the position of the photodetection element which receives the light, it is possible to judge at which position of the photodetection unit 94 the laser beam 4 is received. On the rear surface, a groove 95 to engage with the pole 6 is formed, and the level sensor 7 is mounted by engaging the pole 6 into the groove 95.

The bulldozer 2 will be described.

The bulldozer 2 comprises the level sensor 7, an arithmetic operation unit 104, a blade driving controller 109 for controlling the position of the blade 5, and a radio transceiver unit 110.

First, description will be given on the blade driving controller 109.

The level sensor 7 is mounted on the pole 6, and a distance between a blade tip 5' of the blade 5 and reference position of the level sensor 7 is a value already known. A detection signal of the laser beam 4 by the level sensor 7 is inputted to an arithmetic unit 96. At the arithmetic unit 96, height of the blade tip 5' is calculated, and the arithmetic unit 96 issues a drive control signal to an electric/hydraulic circuit 97. The electric/hydraulic circuit 97 converts the electric signal to hydraulic pressure and drives the hydraulic cylinder 98. The hydraulic cylinder 98 moves the blade 5 up or down and determines its position. A display unit 99 is connected to the arithmetic unit 96, and the position of the blade 5 or excavating status by the blade 5 is displayed on the display unit 99.

Reference numeral 101 denotes an operation unit connected to the arithmetic unit 96. Based on the display on the display unit 99, direct manual operation can be performed. An operator can manually move the blade 5 up or down while watching the display on the display unit 99 and can carry out the positioning operation. A signal from the operation unit 101 is inputted to the arithmetic unit 96. Based on the input signal, the arithmetic unit 96 drives the hydraulic cylinder 98 via the electric/hydraulic circuit 97.

The arithmetic operation unit 104 is typically represented by a personal computer, and it comprises an arithmetic unit 105 and a storage unit 106. In the storage unit 106, topographical data including the area for the scheduled construction, data such as working data at the area of ground leveling operation, and an arithmetic operation program are set and inputted. Based on the above data, the arithmetic operation program calculates data which the blade drive controller 109 requires for controlling. The arithmetic operation unit 104 is particularly needed when construction work is carried out along a predetermined route. In this case, the direction of elevation is taken with the laser reference plane as reference.

The working data as described above include the data such as the level of the ground surface to be leveled, a tilt angle of the leveled ground surface, a tilting direction of the leveled ground surface, and further amounts of unevenness of the leveled ground surface with respect to the reference plane.

Next, the radio transceiver unit 110 will be described.

The first GPS receiver 107 is provided at a place where there is no obstacle to cut off or interrupt electric wave from a satellite, e.g. a roof of the bulldozer 2. Information received by the first GPS receiver 107 is inputted to the arithmetic unit 96. The arithmetic unit 96 carries out arithmetic operation for position surveying based on the signal from the first GPS receiver 107. The result of calculation is transmitted from a transmitter 108 to the radio transceiver 103. The transmitted data may be GPS receiving data.

A construction operation system comprises, as described above, the first GPS receiver 107 for detecting the position of the bulldozer 2, the level sensor 7 for detecting the laser beam reference plane, the arithmetic unit 96 for controlling the position of the blade 5 based on the detection result of the level sensor 7, the transmitter 108 for transmitting the results of detection of the first GPS receiver 107 to the automatic surveying system, etc. The construction operation of the bulldozer 2 is controlled and operated by the construction operation system.

In the following, description will be given on operation.

A plurality of the rotary laser irradiating systems 1a, 1b and 1c are arranged in an area of the scheduled construction. At a position away from the area of the scheduled construction and at a known point, the automatic surveying system 10 and the second GPS receiver 102 are arranged. Prior to the construction, the rotary laser irradiating systems 1a, 1b and 1c and the automatic surveying system 10 are arranged and adjusted so that these are at adequate height.

By the operation control system 12, the automatic surveying system 10 is operated. Distance (distance measurement) and position (angle measurement) between the automatic surveying system 10 and each of the rotary laser irradiating systems 1a, 1b and 1c are measured.

That is, upon receipt of a command from the operation control system 12, the control unit 24 of the automatic surveying system 10 drives the light emitting unit 31 via the modulation circuit 32 and irradiates the distance measuring light 30. Further, the control unit 24 drives the horizontal motor 22 and the elevation motor 23 via the rotary driving unit 25. By changing the elevation angle, the distance measuring light 30 is projected byrotary irradiation for scanning and searching the rotary irradiating system main unit 35. The distance measuring light 30 is reflected by the retroreflection prism 45 of the rotary irradiating system main unit 35. When the reflection light is detected by the photodetection unit 33, the distance is measured by the distance measuring unit 29, and the horizontal angle and the elevation angle are detected by the angle measuring unit 28. As a result, the distance and the position between the automatic surveying system 10 and each of the rotary laser irradiating systems 1a, 1b and 1c are measured.

Further, from the position of the automatic surveying system 10 and from the position of the bulldozer 2 surveyed using the first GPS receiver 107, the operation control system 12 calculates the relative positions of the bulldozer 2 and each of the rotary laser irradiating systems 1a, 1b and 1c.

When surveying operation for the rotary laser irradiating systems 1a, 1b and 1c has been completed, the arithmetic unit 13 calculates a machine height, a reference direction, tilting of the reference plane, etc. of the rotary laser irradiating system 1 at each position of the rotary laser irradiating systems 1a, 1b and 1c from the surveying data (position data) of the rotary laser irradiating systems 1a, 1b and 1c and from the working data stored in the storage unit 14 so that the controlled blade tip 5' of the bulldozer 2 is adjusted to an adequate height at that point.

The result of calculation of the arithmetic unit 13 is inputted to the control unit 24. Based on the calculation results, the control unit 24 drives the light emitting unit 31 via the modulation circuit 32, and the calculation results are superimposed on the distance measuring light 30 (or the tracing light 34) as communication data. The transmission of the data is not limited to the transmission via optical communication, but radio communication may be used by providing the radio transceiver 103 with transmitting function and by providing a radio receiver on the rotary laser systems 1, and radio communication may be carried out between the radio transceiver 103 and each of the rotary laser irradiating systems 1. As the communication data to be transmitted from the automatic surveying system 10 to the rotary irradiating system main unit 35, there are data of the tilt angle and the tilting direction necessary for forming a predetermined laser reference plane by each of the rotary laser irradiating systems.

In this case, the reflection light receiving unit 44 detects the distance measuring light 30 from the automatic surveying system 10, and the rotary laser irradiating systems calculate direction in which the rotary irradiating system main unit 35 is directed. Based on the result, the rotary irradiating system main unit 35 can be directed in the direction designated by the automatic surveying system 10.

To each of the rotary laser irradiating systems 1a, 1b and 1c, communication data is transmitted from the automatic surveying system 10 via optical communication, for instance. The signal received from the signal receiving unit 46 is inputted to the control unit 72. The control unit 72 separates and extracts the communication data superimposed on the distance measuring light 30. Based on the communication data, the rotary irradiating system main unit 35 is directed in the reference direction, and the rotary laser irradiating systems are moved up or down to adjust to the height designated by the operation control system 12. For instance, if there are no surface irregularities in the area of the scheduled construction, the height of each of the rotary laser irradiating systems 1a, 1b and 1c from ground surface will be the same. If there are much unevenness, the height will be different. The range of the area where the bulldozer is operated under the control of each rotary laser irradiating system is basically different.

The communication data to be superimposed on the distance measuring light 30 include a tilt angle of the reference plane with respect to the reference direction, and the control unit 72 operates the tilt setting unit 42. The tilt setting unit 42 drives the tilting motor 62, tilts the light emitting unit 38 via the gear train 63 and tilts the rotation shaft of the rotator 39 in a predetermined direction at a predetermined angle.

When each of the rotary laser irradiating systems 1a, 1b and 1c has completed the operation, i.e. the operation to adjust the machine height, to set the tilt angle of the reference plane, and to set the reference direction, the light emitting unit 38 is driven. The laser beam 4 is irradiated and is synchronously rotated. By synchronous rotation, the laser beams 4 from the rotary laser irradiating systems 1a, 1b and 1c do not enter the level sensor 7 at the same time. By detecting the timing of the photodetection or the receiving of the light from the level sensor 7 by the arithmetic unit 96, the timing of the receiving of the light can be discriminated, and it is possible to judge and identify reference planes 11a, 11b, and 11c formed by the rotary laser irradiating systems 1a, 1b and 1c on the bulldozer 2.

It may be designed in such manner that, by separately modulating the laser beams 4 irradiated by each of the rotary laser irradiating systems 1a, 1b and 1c and by discriminating aspect of modulation from the photodetection signal at the arithmetic unit 96, it is identified from which of the rotary laser irradiating systems 1a, 1b or 1c the laser beam is irradiated, and the reference planes 11a, 11b and 11c are identified.

By the rotary laser irradiating systems 1a, 1b and 1c, it is possible to form the reference plane as desired for controlling the operation of the bulldozer 2 in the total area of the scheduled construction. Further, it is possible to form a reference plane for construction work at the position of the bulldozer 2.

When the reference plane is formed, positioning of the blade 5 of the bulldozer 2 is carried out. The operation control system 12 selects one of the rotary laser irradiating systems 1a, 1b and 1c depending on the position of the bulldozer 2 and controls the bulldozer 2. The bulldozer 2 selects a rotary laser irradiating system to receive the light beam based on the communication from the operation control system 12. Each of the laser beams projected from the rotary laser irradiating systems is modulated.

Based on the photodetection signal from the level sensor 7, the arithmetic unit 96 calculates the photo-receiving position on the level sensor 7. The photo-receiving position and the reference position are compared and calculated, and if there is a deviation, a driving control signal is issued to the electric/hydraulic circuit 97 so that the deviation will be corrected. The electric/hydraulic circuit 97 drives the hydraulic cylinder 98 and moves the blade 5 up or down. The level sensor 7 is moved up or down integrally with the blade 5. Upward or downward movement of the blade 5 is consistent with the upward or downward movement of the level sensor 7. When the photo-receiving position of the level sensor 7 is aligned with the reference position, the position of the blade 5 is determined.

As described above, the topographical data and the working data are set and inputted in the storage unit 106, and it is possible to correct the level with respect to the reference plane or to correct in order to tilt the leveled ground in a certain direction with respect to the reference plane.

The bulldozer 2 is moved, and ground leveling operation is performed. When the bulldozer 2 is moved, the photo-receiving position on the level sensor 7 is varied. If the position of the blade 5 is controlled via the electric/hydraulic circuit 97 in such manner that the photo-receiving position will be the reference position, it is possible to perform ground leveling operation over the total area of the scheduled construction in accordance with the working data.

When ground leveling operation is performed for the ground with some surface irregularities with respect to the reference plane, there are two types of control: blade level control by the arithmetic operation unit 104 on the bulldozer 2, and blade level control by the automatic surveying system 10.

First, description will be given on the blade level control by the arithmetic operation unit 104. In this case, it is assumed that the reference plane formed by each of the rotary laser irradiating systems 1a, 1b and 1c is fixed so far as it is within the photodetection range on the level sensor 7.

As described above, the arithmetic operation unit 104 is provided with the topographical data and the working data. Thus, by using the photo-receiving position as the reference and further by correcting in view of the unevenness, and the position of the blade 5 can be calculated. By inputting the results of the calculation to the arithmetic unit 96, the amount of this correction is taken into account in the arithmetic unit 96, and the level control of the blade 5 can be carried out via the electric/hydraulic circuit 97.

Next, description will be given on the blade level control by the automatic surveying system 10. The arithmetic operation unit 104 does not correct the height direction of the photo-receiving position on the level sensor 7, and it performs level control of the blade 5 using only the reference plane as the reference. The correction of the surface irregularities on the leveled ground is performed by changing the reference plane formed by each of the rotary laser irradiating systems 1a, 1b and 1c.

Because the operation control system 12 is provided with the topographical data and the working data, the level of the ground can be calculated at the point where the bulldozer 2 is operated. Further, the data of the relative positions between the bulldozer 2 and each of the rotary laser irradiating systema 1a, 1b and 1c are obtained by the calculation, and it is possible to calculate the tilting direction and the tilt angle of the reference planes 11a, 11b and 11c in such manner that the photo-receiving position on the level sensor 7 of each of the reference planes 11a, 11b and 11c, which are formed by the rotary laser irradiating systems 1a, 1b and 1c, will be the position where construction work should be performed.

The tilting direction and the tilt angle of each of the reference planes are transmitted to the rotary laser irradiating systems 1a, 1b, and 1c from the radio transceiver 103. Based on the transmitted data, each of the rotary laser irradiating systems 1a, 1b and 1c tilts the reference plane in a predetermined direction at a predetermined angle. When the working site of the bulldozer 2 is moved, the data of the reference planes to be formed are correspondingly transmitted from the automatic surveying system 10 to each of the rotary laser irradiating systems 1a, 1b and 1c, and the height and the tilt angle of the reference planes can be changed by each of the rotary laser irradiating systems 1a, 1b and 1c, and a ground surface with convex and concave as desired can be prepared.

Figure 7:
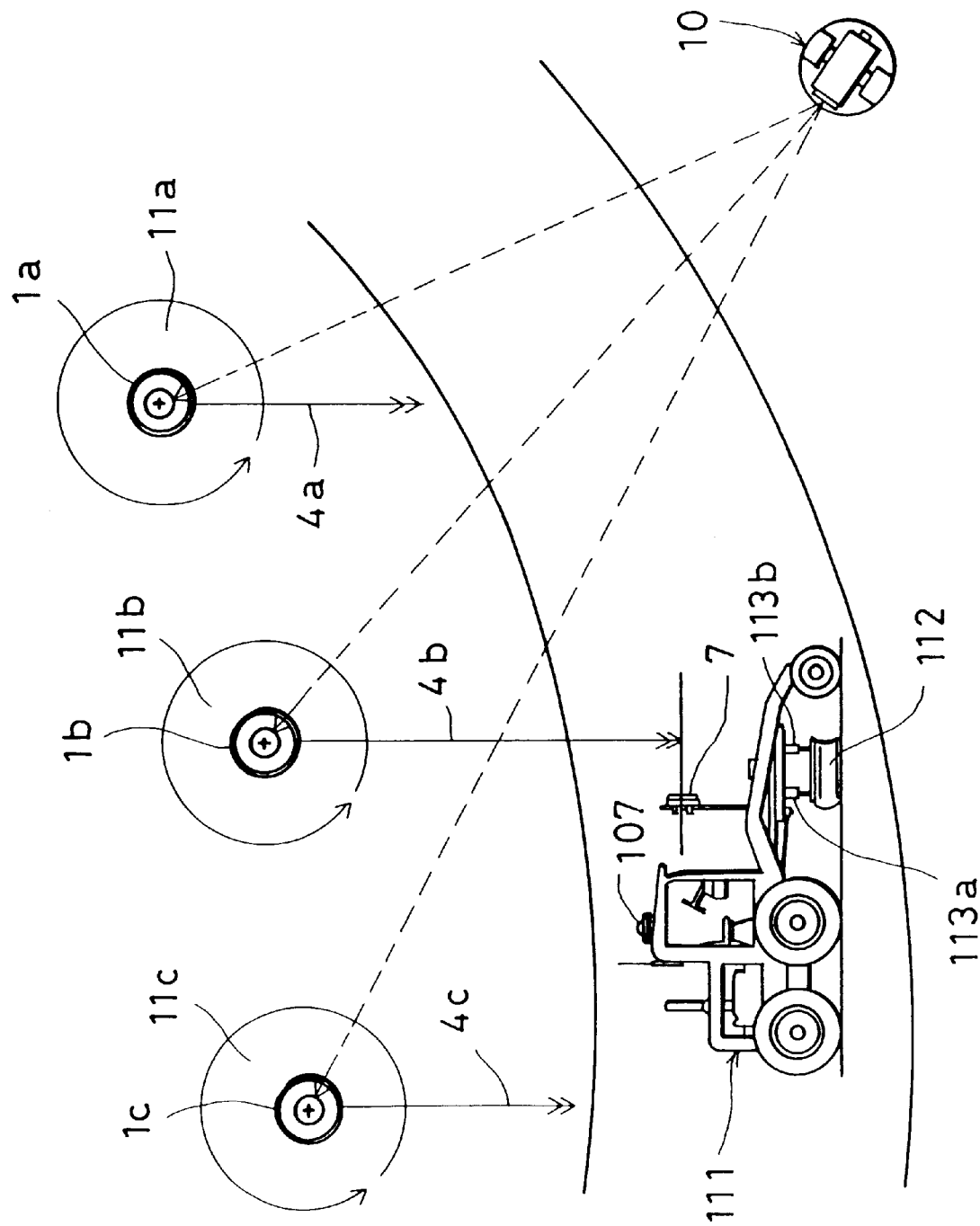
FIG. 7 is a plan view of an arrangement of another embodiment of the present invention.

FIG. 7 shows a case where the construction equipment is a grader 111.

The grader 111 is provided with hydraulic cylinders 113a and 113b, which are independently driven and operated and mounted at left side and right side of a blade 112 respectively.

When the hydraulic cylinders 113a and 113b are controlled independently on the grader 111, the blade 112 can be tilted, and it is possible to form a prepared surface which is curved convexly such as a road.

The height adjustment of the blade 5 and the blade 112 can be controlled manually by a ground leveling operator on the bulldozer 2 or the grader 111 via the electric/hydraulic circuit 97 from the operation unit 101 based on the photodetection status on the level sensor displayed on the display unit 99.

Further, the level sensor 7 is provided on the blade 5 in the above embodiment, while the level sensor 7 may be provided on a vehicle body of the bulldozer 2. This is accomplished when it is designed in such manner that the position of the blade tip 5' is detected via extending or shrinking status of the hydraulic cylinder 98 or via a position of an arm which supports the blade 5.

According to the present invention, a reference plane can be set by a plurality of rotary laser irradiating systems. As a result, the laser reference plane can be formed for wider area, and this eliminates the procedure of re-setting operation of the reference plane on the same construction area. Also, even at a construction site where there is an obstacle to cut off the laser beam, construction work can be performed without re-setting. This makes it possible to eliminate troublesome procedure to stop the working each time for re-setting during construction work. As a result, working efficiency is improved, and error due to the re-setting can be avoided.

What is claimed is:

1. A construction equipment control system, comprising a plurality of rotary laser irradiating systems for forming laser reference planes by irradiating laser beams by rotary irradiation, a surveying system for measuring positions of the rotary laser irradiating systems, and a construction operation system for controlling and operating construction work of a construction equipment based on said laser reference planes, wherein said construction operation system comprises a photodetection sensor for receiving light beams from said rotary laser irradiating systems as reference positions for the construction operation, a global positioning system (GPS) for detecting a position of said construction equipment, and first transmitting means for transmitting detection results of said GPS to said surveying system, said surveying system comprises second transmitting means for transmitting data relating to the reference planes to be formed based on results of measurement and results of detection of said GPS to said rotary laser irradiating systems, said rotary laser irradiating systems comprise receiving means, said receiving means receives said data from said second transmitting means, said rotary laser irradiating systems form said laser reference planes based on said data, and said construction equipment performs construction work using said laser reference planes as reference.

2. A construction equipment control system according to claim 1, wherein said surveying system comprises a operation control system for controlling construction operation of the construction equipment, said operation control system is provided with working data for performing said construction operation, calculates data for forming said laser reference planes necessary for said construction operation based on said working data and the position of the construction equipment determined by said GPS and positions of said rotary laser irradiating systems measured by said surveying system, and transmits said data to said rotary laser irradiating systems, and said laser reference planes necessary for the construction operation are formed by said rotary laser irradiating systems.

3. A construction equipment control system according to claim 2, wherein said working data is height data at a construction site.

4. A construction equipment control system according to claim 2 or 3, wherein said operation control system is provided with working route data indicating a route of construction.

5. A construction equipment control system according to claim 4, wherein said operation control system is provided with tilting data at a construction site in addition to said construction route data indicating said route of construction.

6. A construction equipment control system according to claim 1, wherein said rotary laser irradiating systems comprise a reflection unit for reflecting a distance measuring light beam toward an automatic surveying system, a rotating mechanism for directing the system itself toward a predetermined direction, a signal receiving unit for receiving communication data, a tilting mechanism for tilting said laser reference plane, and a tilt setting unit for controlling said tilting mechanism and said rotating mechanism so that said laser reference plane has a tilt angle in a predetermined direction based on the result received from said signal receiving unit.

7. A construction equipment control system according to claim 1, wherein each of said rotary laser irradiating systems further comprises a lift mechanism, and elevation of said laser reference plane can be adjusted by said lift mechanism and it is controlled by said tilt setting unit together with said tilting mechanism and said rotating mechanism.

8. A construction equipment control system according to claim 1, wherein said rotary laser irradiating systems synchronize rotation of laser beams.

9. A construction equipment control system according to claim 1, wherein said laser beams irradiated from said rotary laser irradiating systems are independently modulated.

10. A construction equipment control system according to claim 9, wherein there is provided an arithmetic unit for identifying said rotary laser irradiating systems based on a laser beam photodetection signal from said photodetection sensor.

* * * * *